United States Patent [19]

Schlottmann et al.

[11] 3,970,180

[45] July 20, 1976

[54] RETRACTABLE STOP

[76] Inventors: Herman Schlottmann, 2299 Rush Lake Road, Pinckney, Mich. 48169; John G. Melchior, 2200 Scottwood No. 310, Toledo, Ohio 43620

[22] Filed: Oct. 22, 1974

[21] Appl. No.: 516,975

[52] U.S. Cl. ............................... 193/35 A; 221/295
[51] Int. Cl.² ......................................... B65G 13/00
[58] Field of Search ..................... 193/32, 35 A, 40; 221/289, 295; 198/34

[56] References Cited
UNITED STATES PATENTS

| | | | |
|---|---|---|---|
| 1,669,497 | 5/1928 | Steegmuller | 193/35 A |
| 2,738,103 | 3/1956 | Bisese | 193/35 A X |
| 2,980,222 | 4/1961 | Crosby | 193/35 A |
| 3,066,828 | 12/1961 | Blake | 193/35 A X |
| 3,088,569 | 5/1963 | McClelland | 193/35 A X |
| 3,216,547 | 11/1965 | De Good | 193/35 A X |
| 3,819,023 | 6/1974 | McClelland | 193/40 |
| 3,830,409 | 8/1974 | Jenkinson | 221/289 X |

*Primary Examiner*—Richard A. Schacher
*Assistant Examiner*—James L. Rowland

[57] ABSTRACT

A solenoid actuated retractable stop including a pivoted arm selectively operable to block or pass articles moving along the surface of a roller conveyor characterized by a positive stop linkage adapted to resist impact engagement and cumulative loading of articles travelling on a conveyor including a pivoted mounting for the stop with lever linkage adapted to raise the stop above the conveyor surface level, a positive latch mechanism for holding the lever linkage in the raised stop position, a solenoid adapted to release the latch mechanism so that forward force of an article against the stop will cause it to pivot to a retracted position below the level of the conveyor and remain there during the overpassing of any article load, and a spring return mechanism adapted to raise the stop and reengage the latch upon de-energizing the solenoid subject to completion of any overpassing of any article load.

4 Claims, 3 Drawing Figures

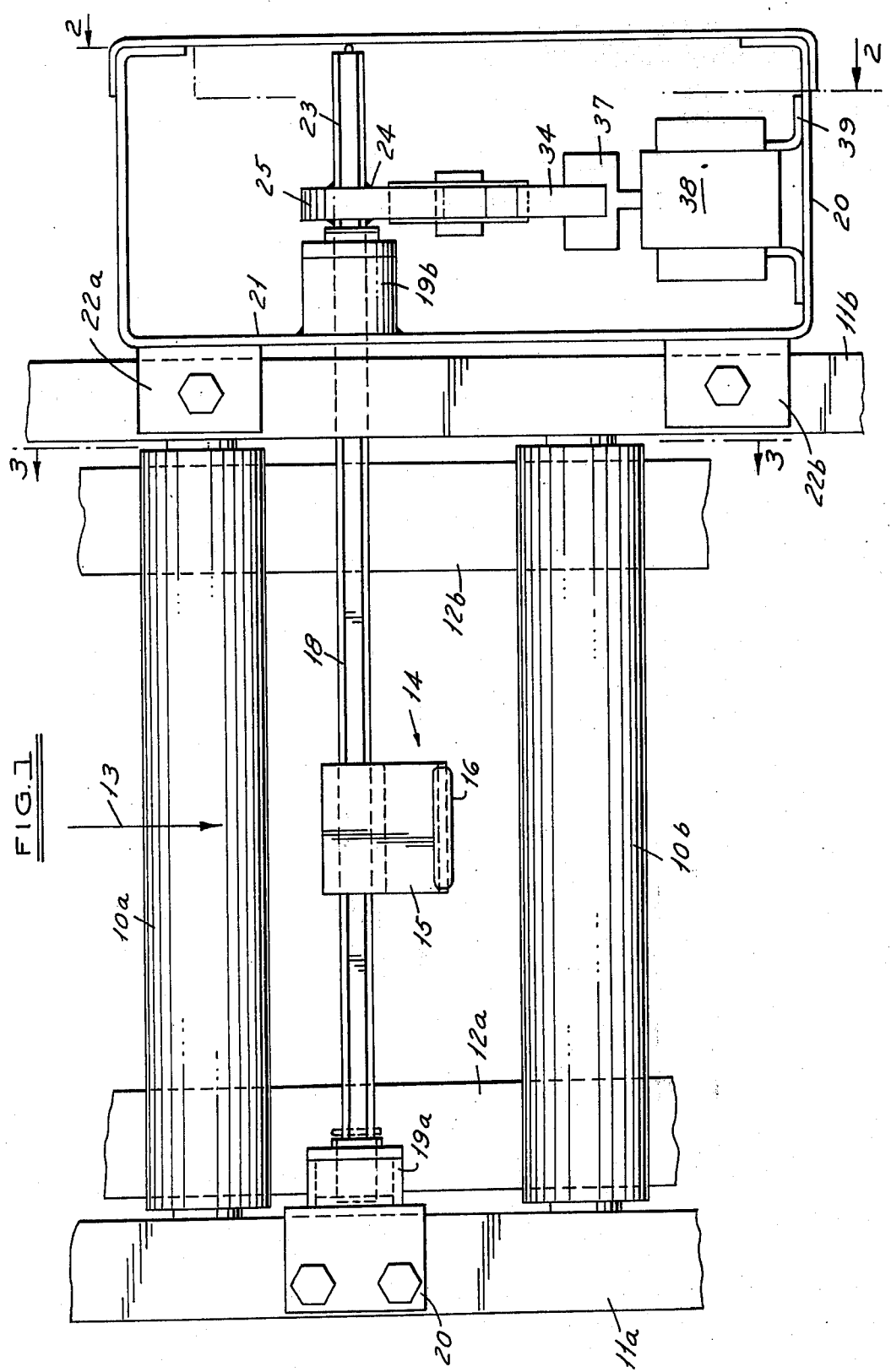

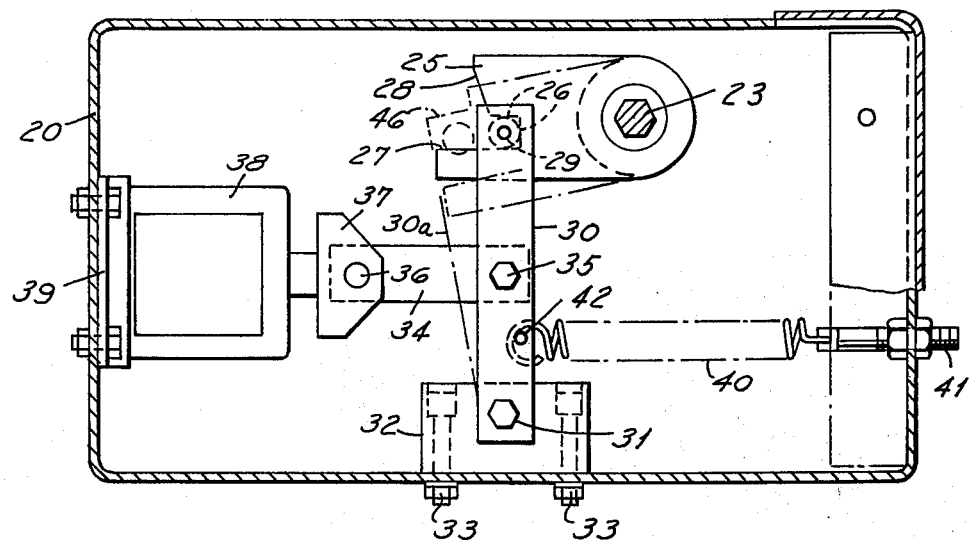
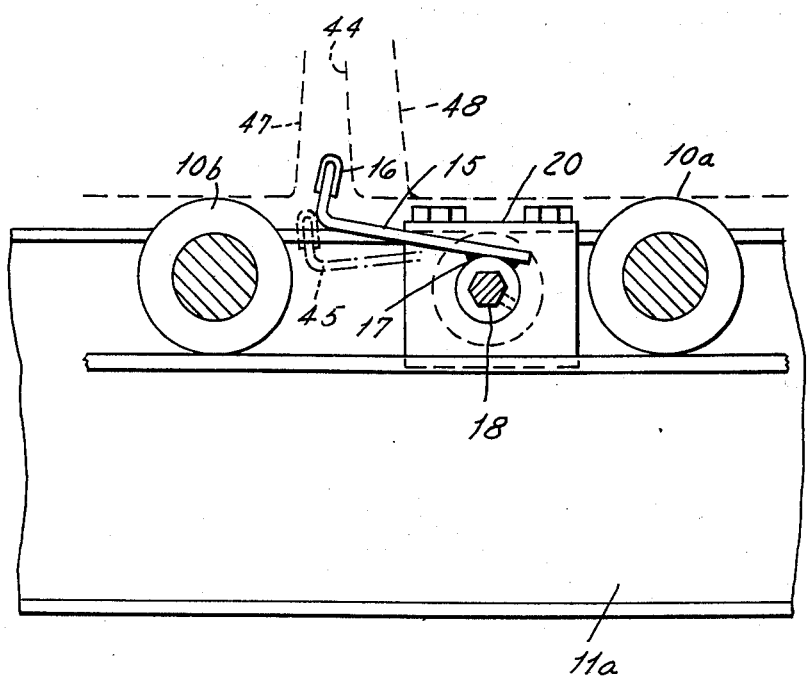

RETRACTABLE STOP

BACKGROUND OF THE INVENTION

Selectively operable stop mechanisms for blocking and releasing articles conveyed on gravity or powered roller conveyors are common in the art and a wide variety of mechanisms have been employed for actuating such stops to blocking and retracted positions. The various criteria for completely dependable action under all possible conditions render the provision of a simple mechanism meeting all requirements a more difficult problem than apparent from initial consideration. In view of the impact and cumulative loads that may build up against the stop, there is a need for a blocking action of the stop which can withstand considerable force without yielding; since it is frequently necessary for the stop to be retracted under a highly loaded condition it is necessary to accommodate or eliminate friction in the linkage components which provide the holding resistance when it is desired to release the stop; at the same time it is desirable that the stop may be released without drag on the article which might otherwise cause wear or damage; it is desirable that any mechanism for returning the stop from retracted to blocking position be rendered automatically inoperative during any overpassing of an article while being capable of immediately moving to a stop position as soon as the trailing edge of the article has passed so as to be capable of intercepting the next article in case it is following in close proximity to that passing over the stop; it is desirable to accomplish these objectives with a simple solenoid actuation preferably de-energized when the stop is in operative position; it is desirable to stop and engage the leading edge of an article in a manner which will avoid overriding from the impact of either a single load or other loads behind it. In the end it is, of course, desirable that all of these objectives be met with a construction which is as simple and inexpensive as possible.

SUMMARY OF THE INVENTION

In the present case these objectives are met by a construction in which a cross bar extending transversely of the roller conveyor between adjacent rollers is mounted in pivotal bearings at either end with a stop member of suitable width rigidly mounted at the center having its stop engaging surface located above and ahead of the pivotal axis so that upon release the engaging surface may swing forward and downward under actuation by the leading edge of the article and be retained in a retracted position by engagement with the bottom surface of the article as it overpasses so that the stop will have a minimum distance to move in reestablishing a blocking position. A positive latch is provided which will resist any loading on the stop within the strength of the components employed which can be readily disengaged by solenoid actuation to effect a release of the stop through movement of an anti-friction roller. A spring return of the latch is inhibited by engagement of such roller with a bevelled surface angled to provide a restoring component for swinging the stop back into its operative position as soon as any article load passes off, such angle being insufficient however to cause any restoring force to raise an article having its lower surface engaging the stop in retracted position.

IN THE DRAWINGS:

FIG. 1 is a fragmentary plan view of a roller conveyor with the retractable stop of the present invention installed between adjacent rollers;

FIG. 2 is a sectional side elevation taken along the line 2—2 of FIG. 1;

FIG. 3 is a sectional side elevation taken along the line 3—3 of FIG. 1.

DESCRIPTION:

With reference to FIG. 1 a roller conveyor having rollers 10a and 10b mounted between side rails 11a, 11b driven by belts 12a, 12b for conveying articles, such as mail trays in a post office installation, along conveyor path 13 has interposed between adjacent rollers a stop assembly 14 comprising an angle stop arm 15 with a resilient stop pad 16 attached to the leading upwardly extending edge thereof. The stop arm is rigidly attached as by welding 17 (FIG. 3) to a cross shaft 18 mounted in pivot bearings 19a and 19b held respectively by a bracket 20 to side rail 11a and to housing 21 mounted on brackets 22a and 22b to side rail 11b. An extension 23 of the shaft 18 is welded at 24 to a latch plate 25 having a latch recess 26, a lower extension 27 and an upper angular extension 28 adapted for engagement by an anti-friction roller 29 mounted between a pair of side arms 30 pivotally connected at 31 to a base 32 attached to the sidewall of the housing by bolts 33. At the center of the arms 30 a link 34 is pivotally connected at 35 and the other end 36 connected to the plunger 37 of a solenoid 38 mounted with angle brackets 39 to an end wall of the housing 20. A tension return spring 40 is adjustably anchored at 41 to the other end wall of the housing connected by pin 42 to the side arms 30.

In operation, energizing the solenoid 38 actuates the link 34 to pivot the arms 30 to the dotted line position 30a releasing the anti-friction roller 29 from the latch recess 26 whereupon engagement with the upper end 16 of the stop arm 15 by an article, such as a mail tray 44 travelling on the surface of roller 10a, causes the stop arm to pivot around the axis of the cross shaft 18 to a retracted position where the tray will overpass the stop and move along over the roller 10b and successive rollers. The overpassing position 45 of the stop arm 15 as shown in FIG. 3 corresponds to the dotted line position 46 of the latch lever 25 as shown in FIG. 2 in which position the angle extension 28 will serve to block the return of the roller 29 to the latched recess 26 while providing an upward component of force under the tension of spring 40 when the solenoid 38 is de-energized sufficient to rotate the latch lever 25 in a clockwise direction together with the stop arm 15 as soon as the trailing edge 47 of any overpassing tray moves off the surface of the stop extension 16 whereupon the latch is reengaged before a succeeding mail tray 48 reaches the stop.

It will be seen in FIG. 3 that the stop arm extension 16 extends substantially above the lower surface of the tray and is angled slightly backward to assure engagement at a high enough point to prevent overriding upon impact and it will be further apparent from the geometry shown in FIG. 3 that upon initial release of the latch any retaining load on the upper end extension 16 of the stop arm will cause such extension to swing forwardly and downwardly to relieve the pressure without wear or damaging sliding movement on the forward end of the tray.

Thus, a simple, effective and dependable stop construction has been provided which meets all of the criteria objectives with minimal opportunity for malfunction.

We claim:

1. A retractable stop mechanism for arresting article travel along a roller conveyor characterized by a stop arm pivotally mounted between adjacent rollers to extend above and below the upper support surface of the rollers in respective blocking and retracted passing positions, the geometry of said stop arm mounting causing forward article travel along said conveyor to move said stop arm from said blocking to said retracted position, a latch means for holding the stop arm in said blocking position, selectively operable means for releasing said latch mechanism to permit an article travelling on the roller conveyor to retract and pass over the stop arm, means for restoring said stop arm and latch means to said blocking position, and article weight responsive means for rendering said last means inoperative during the overpassing of any article begun prior to said restoration; said retractable stop mechanism including a cross shaft with pivotally mounted ends having said stop arm rigidly mounted thereon, said latch means comprising a latch plate secured to said cross shaft with means for engaging said latch plate to prevent its pivotal movement when said stop arm is in blocking position including a recess in said latch plate spaced from the shaft pivotal axis, a roller for engaging said recess in a direction opposing pivotal movement of said latch plate and cross shaft, and a retractable reactive mounting for said roller movable between operative blocking and inoperative nonblocking positions in response to said selectively operable means.

2. A retractable stop mechanism as set forth in claim 1 including pivotally mounted arm means for mounting said roller where in blocking position the reactive line of force passes substantially through the axis of said roller and said pivotal arm mounting.

3. A retractable stop mechanism as set forth in claim 2 wherein said latch plate includes an angular extending surface adapted to delay the restoration of said latch means to a blocking position during the overpassing of an article.

4. The retractable stop mechanism as set forth in claim 3 including roller means adapted to engage said angular surface creating a component of force sufficient to restore said stop arm and latch means to blocking position in the absence of an overpassing load.

* * * * *